United States Patent Office 2,946,788
Patented July 26, 1960

2,946,788
DIHYDRO-M-THIAZINE-Δ-3,4 COMPOUNDS AND PROCESS FOR THEIR PREPARATION

Friedrich Asinger and Max Thiel, Leuna, and Walter Höringklee, Halle, Germany, assignors to VEB Leuna-Werke "Walter Ulbricht," Leuna, Germany No Drawing. Filed Aug. 22, 1957, Ser. No. 679,773

Claims priority, application Germany Oct. 6, 1956

27 Claims. (Cl. 260—243)

The present invention relates to dihydro-m-thiazine-Δ-3,4 compounds and to a process for the preparation of these compounds.

Several isomeric dihydro-1,3-thiazines are theoretically possible. The ring structures of the possible isomers may be designated by the following structural formula:

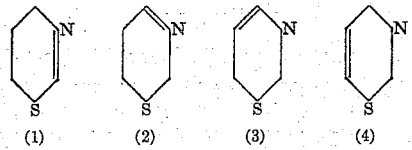

(1)   (2)   (3)   (4)

A method for the preparation of compounds containing the nucleus (2) above has not been described in the literature.

It is an object of the present invention to provide a process for the preparation of dihydro-1,3-thiazines having the nucleus of Formula 2 above.

It is also an object of this invention to provide substituted products of Formula 2 above.

Other and more detailed objects of this invention will be apparent from the following description and claims.

It has been found that dihydro-m-thiazine-Δ-3,4 compounds of this invention may be prepared simply and economically by the reaction of a β-mercaptoketone, an organo oxo compound (e.g. aldehyde or ketone) and ammonia or an ammonium salt of a weak acid (e.g. ammonium carbonate, ammonium acetate, etc). The reaction is exothermic and commences on the mixing of the reactants in the reaction vessel at room temperature. In some cases it is advantageous to slightly heat the reaction mixture to initiate the reaction which then becomes self-sustaining by the heat evolved during the reaction. In some cases the yield of the product is increased by cooling the reaction mixture to about −10° C. In general the reaction may be carried out within the temperature range of about 100° C. to about −15° C. The yields obtained are almost quantitative.

The organo oxo reactants that may be employed in the process of this invention are quite varied. They may be aliphatic, alicyclic, heterocyclic, aryl or aralkyl ketones, as well as aliphatic, alicyclic, aromatic, heterocyclic or aralkyl aldehydes. The ketones that are useful for the purposes of this invention are the symmetrical or unsymmetrical ketones. It is also possible to employ aldehydes or ketones which carry other functional groups.

The β-mercaptoketone reactant employed in this process also varies considerably. They may comprise the simple aliphatic β-mercaptoketone or may be the substituted aliphatic β-mercaptoketones wherein the substituents are aliphatic, aromatic, heterocyclic or various functional groups.

More particularly the present invention is directed to the preparation of compounds of general formula:

(5)

$$\begin{array}{c} R^1 \\ R-C \\ R-C \quad N-R \\ R-C \quad C \\ R \quad S \quad R \end{array}$$

wherein $R^1$ is a monovalent radical selected from the class consisting of alkyl, cycloalkyl and aryl radical; and R is selected from the class consisting of H, alkyl, cycloalkyl, aryl and aralkyl radicals. It is to be understood that the R and $R^1$ groups in Formula 5 above need not represent the same group throughout but may have any of the values included within the definition. When R or $R^1$ are alkyl radicals in Formula 5, they represent any alkyl group. By way of illustration may be mentioned the alkyl groups having from 1 to 20 carbon atoms including the methyl, ethyl, propyl, isopropyl, butyl, tert, butyl, isobutyl, amyl, hexyl, 2-ethylhexyl, heptyl, octyl, isooctyl, nonyl, decyl, undecyl, dodecyl, tridecyl, tetradecyl, pentadecyl, hexadecyl and eicosyl. In a preferred form of this invention the alkyl groups represented by R and $R^1$ are lower alkyl groups and, more particularly, alkyl groups having from 1 to 8 carbon atoms in the alkyl groups. The cycloalkyl radicals included within the definition of R and $R^1$ are, preferably, those having from 4 to 12 carbon atoms in the ring structure.

The aryl and aralkyl radicals represented by $R^1$ and R above are monovalent carbocyclic aryl or aralkyl radicals, and more particularly, those having from 1 to 3 rings in the aryl ring. By way of illustration may be mentioned the phenyl, naphthyl, anthracyl, benzyl, phenyl ethyl, phenylpropyl, tolyl, xylyl, ethylphenyl, propylphenyl, hydroxyphenyl, hydroxynaphthyl, biphenyl, terphenyl, tetralinyl radicals.

In a preferred form of this invention when R or $R^1$ is an aryl radical, it is a monovalent monocyclic aryl radical, e.g. phenyl, monohydroxyphenyl, alkyl substituted phenyl, and monohydroxy alkyl substituted phenyl radicals. Similarly, the preferred aralkyl radicals are the monovalent monocyclic aralkyl radicals, e.g. phenylalkylene, alkyl substituted phenylalkylene, monohydroxy phenylalkylene, and monohydroxy alkyl substituted phenylalkylene radicals. These may be described by the formula $$\begin{array}{c} R''' \\ \bigcirc-R'' \\ R'''' \end{array}$$

wherein R″ is the divalent alkylene radical (e.g.—$CH_2$—, —$CH_2$—$CH_2$—, etc.) preferably having from 1 to 8 carbon atoms in the alkylene chain and R‴ and R⁗ are H, alkyl or OH.

The reaction involved in the present case may be illustrated by the following equation:

(6)

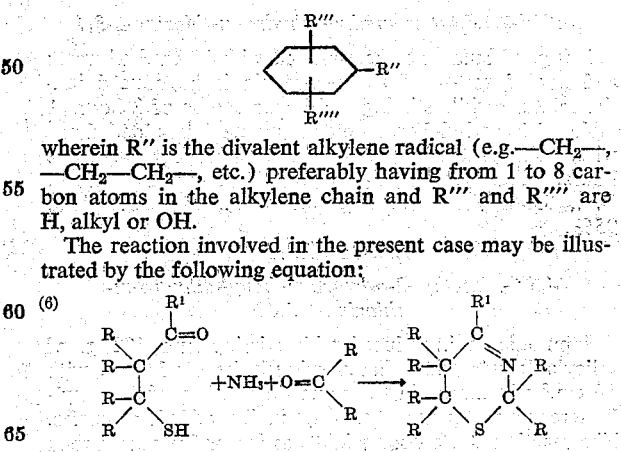

wherein R and $R^1$ are as defined above.

It is also within the scope of the present invention to form the β-mercaptoketone reactant in the reaction mixture, as distinguished from the addition of the preformed β-mercaptoketone to the reaction mixture. This may be accomplished by introducing a mixture of H₂S and ammonia into, preferably, an equilmolar mixture of an α,β-unsaturated ketone and an aldehyde or ketone. The H₂S reacts at the double bond of the α,β-unsaturated ketone and forms the β-mercaptoketone. The β-mercaptoketone so formed then reacts with the aldehyde or ketone and ammonia in accordance with Equation 6 above. This overall reaction may be described by the following equation:

(7)

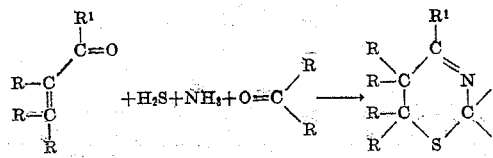

wherein $R^1$ and R have the same significance ascribed to them above. In place of the ammonia shown in Equation 7 an ammonium salt of a weak acid may be employed, e.g. ammonium carbonate, ammonium acetate, etc.

The present invention provides a particularly simple method of converting acetone into a dihydro-m-thiazine-Δ-3,4 compound. The introduction of H₂S and ammonia into acetone converts the acetone to 2,2,4,6,6-pentamethyl-dihydro-m-thiazine-Δ-3,4. It is thought that in this case mesityl oxide (the α,β-unsaturated ketone) is formed as an intermediate, which reacts with the H₂S to form the β-mercaptoketone. This β-mercaptoketone then reacts with the ammonia or the ammonium salt employed and the unconverted acetone present in the reaction mixture to yield the dihydro-m-thiazine-Δ-3,4 compound.

The following examples are further illustrative of the present invention, and it will be understood that the invention is not limited thereto:

EXAMPLE I

*4,6,6-trimethyl-dihydro-m-thiazine-Δ-3,4*

Ammonia is introduced with stirring into 500 grams of a formaldehyde solution of 40% strength, which is continuously cooled to —10° C. At the same time, 132 g. of 2-methyl-2-mercaptopentanone-4 is added dropwise in the course of 2 hours. After another hour, during which ammonia is continuously supplied, the reaction is completed. The dihydrothiazine obtained is extracted with ether and is distilled after removal of the ether. B.P., 74–76° C./12 mm. Hg; picrate F., 195° C.; yield, 95%.

Instead of the formaldehyde solution, an aqueous solution of urotropine may be used in this example.

EXAMPLE II

*2-ethyl-2,4,6,6-tetramethyl-dihydro-m-thiazine-Δ-3,4*

360 g. of butanone are admixed with 20 cm.³ of water and cooled to —10° C. Ammonia is introduced into the mixture while stirring and in the course of 2 hours 1 mole of 2-methyl-2-mercaptopentanone-4 is added dropwise. Thereafter ammonia is introduced for further 2 hours. The working up is effected as in Example I. B.P., 85–87°/12 mm. Hg; picrate F., 173° C.; yield, 95%.

EXAMPLE III

*4,6,6-trimethyl-2-o-hydroxyphenyl-dihydro-m-thiazine-Δ-3,4*

Ammonia is introduced with stirring into 122 g. of salicylaldehyde which has previously been admixed with 10 cm.³ of water. At the same time 132 g. of 2-methyl-2-mercaptopentanone-4 are gradually added dropwise. The reaction starts upon slight heating and proceeds then with vigorous heat development. The product precipitates as a solid yellow mass. After re-crystallization from n-propanol the dihydrothiazine is obtained in the form of white crystals. F., 136° C.; yield, 100%.

EXAMPLE IV

*4,6,6-trimethyl-2-o-hydroxylphenyl-dihydro-m-thiazine-Δ-3,4*

122 g. of salicylaldehyde, 132 g. of 2-methyl-2-mercaptopentanone-4, 171 g. of ammonium carbonate and 250 cm.³ of water are mixed with each other. Upon slight heating the reaction starts with the evolution of CO₂. The reaction is terminated after about 1 hour. The dihydrothiazine is obtained in crystalline form and is recrystallized from n-propanol. F., 136° C.; yield, 97%.

EXAMPLE V

*2-propyl-4,6-dimethyl-dihydro-m-thiazine-Δ-3,4*

84 g. of methyl propenyl ketone and 144 g. of butyraldehyde are mixed while cooling to —10° C. and admixed with 10 cm.³ of water. Then ammonia and H₂S in a volume ratio of 2:1 are introduced with stirring. The reaction mixture should be kept constantly at —10° C. The reaction is completed after 3 hours. 200 cm.³ of 10% NaOH solution are added and then the reaction mixture is extracted with ether. The ethereal extract solution is then washed with water, dried with sodium sulfate and finally concentrated. Fractionated distillation of the residue yields the dihydrothiazine in 84% yield. B.P. 97–99°/12 mm. Hg.

EXAMPLE VI

*2,2,4,6,6-pentamethyl-dihydro-m-thiazine-Δ-3,4*

98 g. of mesityloxide are mixed with 580 g. of acetone and 20 cm.³ of water are added thereto. Ammonia and H₂S (volume ratio 2:1) are introduced into the solution while stirring. The temperature in the reaction vessel rises to 42° C. After 4 hours the reaction is completed. 200 cm.³ of water are added and ether extraction is performed.

The ether solution is dried with Na₂SO₄ and yields the dihydrothiazine in 90% yield. B.P. 69°–72°/12 mm. Hg; picrate F., 183° C.

EXAMPLE VII

*2,2,4-trimethyl-6-phenyl-dihydro-thiazine-Δ-3,4*

146 g. of benzalacetone are dissolved in 580 g. of acetone and 20 cm.³ of water are added thereto. While stirring, ammonia and H₂S are introduced into the solution in a volume ratio of 2:1. The reaction starts immediately and the temperature rises to 40° C. The reaction is completed after about 4 hours. 100 cm.³ of 40% NaOH solution are added. Then the solution is taken up in ether, the ethereal solution is washed with water and dried with Na₂SO₄. Upon distillation of the residue the dihydrothiazine is obtained in 85% yield. B.P. 159–161° C./12 mm. Hg.

EXAMPLE VIII

*2,2,4,6,6-pentamethyl-dihydro-m-thiazine-Δ-3,4*

290 g. of acetone is admixed with 20 cm.³ of water. While stirring, ammonia and H₂S are simultaneously introduced in a volume ratio of 2:1. The temperature rises to about 45° C. The reaction is completed after about 3 hours. The reaction mixture is then diluted with 200 cm.³ of water and 100 cm.³ of 40% NaOH solution are added, whereby an oily layer separates. The layer is taken up in ether. Working up as in Example 2. B.P. 69–72° C./12 mm. Hg; picrate F., 183° C.; yield, 30%.

EXAMPLE IX

*2,2,4,6,6-pentamethyl-dihydro-m-thiazine-Δ-3,4*

H₂S is introduced while stirring into a mixture of 98 g. of mesityloxide, 240 g. of acetone, 154 g. of ammonium acetate and 250 cm.³ of water. The reaction is completed after 3 hours. After addition of 200 cm.³ of NaOH solution (40% concentration) the mixture is extracted with ether. The ether solution is washed with water and dried with sodium sulfate. Upon distillation the dihydrothiazine is obtained in 75% yield. B.P. 69–72° C./12 mm. Hg; picrate F., 183° C.

The dihydro-m-thiazine-Δ-3,4 compounds have a strong physiological activity and may be used in the synthesis of therapeutic compounds. They are also useful as accelerators in the vulcanization of rubber, as pesticides, as wood preservatives, as weed killers, as rust inhibitors and for the protection against aging.

While the invention has been described with reference to various examples and embodiments, it will be apparent to those skilled in the art that various modifications may be made, and equivalents substituted therefor, without departing from the principles and true nature of the present invention.

What is claimed is:

1. A process for the preparation of 2,2,4,6,6-pentamethyl-dihydro-m-thiazine-Δ-3,4 which comprises, reacting acetone with a mixture of $H_2S$ and a compound selected from the class consisting of ammonia and ammonium salts of a weak acid.

2. As a composition of matter a compound of general formula

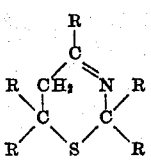

wherein R is lower alkyl.

3. As a composition of matter, a compound of general formula

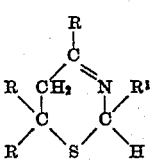

wherein R is lower alkyl.

4. As a composition of matter, a compound of general formula

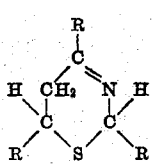

wherein R is lower alkyl and $R^1$ is monocarbocyclic aryl.

5. As a composition of matter, a compound of general formula

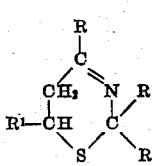

wherein R is lower alkyl.

6. As a composition of matter, a compound of general formula

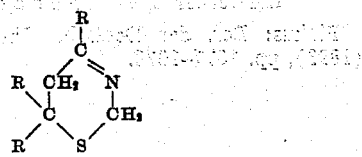

wherein R is lower alkyl and $R^1$ is monocarbocyclic aryl.

7. A process according to claim 16, wherein the ammonium salt of said weak acid is ammonium carbonate.

8. A process according to claim 7 wherein the reaction is carried out at temperatures within the range of 60° C. to about −15° C.

9. A process for the preparation of 2,2,4,6,6-pentamethyl-dihydro-m-thiazine-Δ-3,4 which comprises introducing a mixture of $NH_3$ and $H_2S$ in the ratio of 1:1 by volume into acetone and allowing said mixture to react to produce the desired compound.

10. As a composition of matter: 4,6,6-trimethyl-dihydro-m-thiazine-Δ-3,4.

11. As a composition of matter: 4,6,6-trimethyl-2-o-hydroxyphenyl-dihydro-m-thiazine-Δ-3,4.

12. As a composition of matter: 2-ethyl-2,4,6,6-tetramethyl-dihydro-m-thiazine-Δ-3,4.

13. As a composition of matter: 2-propyl-4,6-dimethyl-dihydro-m-thiazine-Δ-3,4.

14. As a composition of matter: 2,2,4,6,6-pentamethyl-dihydro-m-thiazine-Δ-3,4.

15. As a composition of matter: 2,2,4-trimethyl-6-phenyl-dihydro-m-thiazine-Δ-3,4.

16. A process for the preparation of dihydro-m-thiazine-Δ-3,4 compounds which comprises reacting a β-mercaptoketone of formula

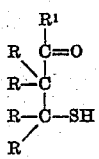

with an organo oxo carbonyl compound of formula

and a nitrogen compound selected from the class consisting of ammonia and an ammonium salt of a weak acid, wherein R' is a monovalent radical selected from the class consisting of alkyl, cycloalkyl, monocarbocyclic aryl and monocarbocyclic aralkyl, and R is a radical selected from the group consisting of hydrogen, alkyl, cycloalkyl, monovalent monocarbocyclic aryl and monovalent monocarbocyclic aralkyl, said alkyl radicals having from 1 to 20 carbon atoms in the alkyl chain, and said cycloalkyl radicals having from 4 to 12 carbon atoms in the cycloalkyl ring.

17. A process for the preparation of dihydro-m-thiazine-Δ-3,4 compounds which comprises reacting an α,β-unsaturated ketone of formula

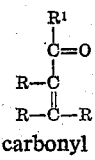

with an organo oxo carbonyl compound of formula

ammonia and $H_2S$, said ammonia and $H_2S$ being employed in the proportion of volume of 1:1, wherein R' is a radical selected from the group consisting of alkyl, cycloalkyl, monovalent monocarbocyclic aryl and monovalent monocarbocyclic aralkyl, and R is a radical selected from the group consisting of hydrogen, alkyl, cycloalkyl, monovalent monocarbocyclic aryl and monovalent monocarbocyclic aralkyl, said alkyl radicals having from 1 to 20 carbon atoms in the alkyl chain, and said cycloalkyl radicals having from 4 to 12 carbon atoms in the cycloalkyl ring, a β-mercaptoketone being formed in situ in the reaction.

18. A process for the preparation of 4,6,6-trimethyl-dihydro-m-thiazine-Δ-3,4 which comprises reacting 2-methyl-2-mercaptopentanone-4 with ammonia and formaldehyde.

19. A process for the preparation of 2-ethyl-2,4,6,6-tetramethyl-dihydro-m-thiazine-Δ-3,4 which comprises reacting butanone with ammonia and 2-methyl-2-mercaptopentanone-4.

20. A process for the preparation of 4,6,6-trimethyl-2-o-hydroxyphenyl-dihydro-m-thiazine-Δ-3,4 which comprises reacting ammonia with salicylaldehyde and 2-methyl-2-mercaptopentanone-4.

21. A process for the preparation of 4,6,6-trimethyl-2-o-hydroxylphenyl-dihydro-m-thiazine-Δ-3,4 which comprises reacting salicylaldehyde with 2-methyl-2-mercaptopentanone-4 and ammonium carbonate.

22. A process for the preparation of 2-propyl-4,6-dimethyl-dihydro-m-thiazine-Δ-3,4 which comprises reacting methyl propenyl ketone with butyraldehyde, ammonia and $H_2S$.

23. A process for the preparation of 2,2,4,6,6-pentamethyl-dihydro-m-thiazine-Δ-3,4 which comprises reacting mesityloxide with ammonia, acetone and $H_2S$.

24. A process for the preparation of 2,2,4-trimethyl-6-phenyl-dihydro-m-thiazine-Δ-3,4 which comprises reacting benzalacetone with acetone, ammonia and $H_2S$.

25. A process for the preparation of 2,2,4,6,6-pentamethyl-dihydro-m-thiazine-Δ-3,4 which comprises reacting $H_2S$ with mesityloxide, acetone and ammonium acetate.

26. As a composition of matter, a compound of formula

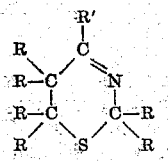

wherein R' is a monovalent radical selected from the class consisting of alkyl, cycloalkyl, monocarbocyclic aryl and monocarbocyclic aralkyl, and R is a radical selected from the group consisting of hydrogen, alkyl, cycloalkyl, monovalent monocarbocyclic aryl and monovalent monocarbocyclic aralkyl, said alkyl radicals having from 1 to 20 carbon atoms in the alkyl chain, and said cycloalkyl radicals having from 4 to 12 carbon atoms in the cycloalkyl ring.

27. A process according to claim 16 wherein the β-mercaptoketone reactant is formed in situ in the reaction mixture, through the condensation of acetone to form the α,β-unsaturated ketone, and the subsequent reaction of the so formed α,β unsaturated ketone with $H_2S$ to form the β-mercaptoketone reactant.

References Cited in the file of this patent

Pinkus: Ber. der Deutsche Chem. Gesell., vol. 26 (1893), pp. 1077–1078.